(12) United States Patent
Twu et al.

(10) Patent No.: US 6,869,711 B2
(45) Date of Patent: Mar. 22, 2005

(54) HIGHLY EFFICIENT ELECTROCHEMICAL REACTION DEVICE

(75) Inventors: Hung-Sen Twu, Taipei Hsien (TW);
Ming-Jye Tsai, Hsin-Chu Hsien (TW);
Chia Lin Wu, Tao-Yuan Hsien (TW);
Lieh-Hsi Lo, Taipei (TW)

(73) Assignee: Industrial Technology Research Institute, Hsiu-Chu Hsien (TW)

( * ) Notice: Subject to any disclaimer, the term of this patent is extended or adjusted under 35 U.S.C. 154(b) by 407 days.

(21) Appl. No.: 09/948,591

(22) Filed: Sep. 10, 2001

(65) Prior Publication Data

US 2003/0049516 A1 Mar. 13, 2003

(51) Int. Cl.[7] .............................. H01M 8/10; H01M 8/02
(52) U.S. Cl. ........................................ 429/30; 429/34
(58) Field of Search .............................. 429/30, 33, 44

(56) References Cited

U.S. PATENT DOCUMENTS

| | | | |
|---|---|---|---|
| 4,038,463 A | * | 7/1977 | Lamarine et al. ............. 429/44 |
| 5,039,492 A | * | 8/1991 | Saaski et al. ............. 422/82.09 |
| 5,724,175 A | * | 3/1998 | Hichwa et al. ............. 359/265 |
| 6,641,948 B1 | * | 11/2003 | Ohlsen et al. ................. 429/44 |
| 2002/0012825 A1 | * | 1/2002 | Sasahara et al. ............. 429/30 |
| 2002/0127450 A1 | * | 9/2002 | Xie ............................. 429/30 |
| 2003/0152817 A1 | * | 8/2003 | Sato et el. ..................... 429/30 |

FOREIGN PATENT DOCUMENTS

| JP | 7-326363 | * 12/1995 | ............ H01M/8/10 |
|---|---|---|---|
| JP | 2000-331696 | * 11/2000 | ............ H01M/8/10 |

* cited by examiner

Primary Examiner—Stephen J. Kalafut
(74) Attorney, Agent, or Firm—Bacon & Thomas PLLC

(57) ABSTRACT

The present invention is to provide a kind of electrochemical reaction substrate, wherein on one side of substrate it forms having plural sets of slots with an appropriate width-depth ratio and holes penetrated substrate with an appropriate size, electrolytes are formed in the penetrated holes to produce an electrolytic layer on the surface of substrate, on the electrolytic layer it sequentially forms a selective isolating layer, a porous conductive material layer, and a catalytic material layer, among them the selective isolating layer is also formed between a double-layer substrates, through a process described above it forms the structure of a highly efficient electrochemical reaction substrate.

20 Claims, 6 Drawing Sheets

HIGHLY EFFICIENT ELECTROCHEMICAL REACTION DEVICE

BACKGROUND OF INVENTION

1. Field of Invention

The present invention is to provide a kind of electrochemical reaction device, wherein through increasing the total contacting surface area for the substrate area and electrolytes it forms a highly efficient electrochemical reaction device and also minimizes the battery volume.

2. Description of the Prior Art

The present invention is to provide a kind of electrochemical reaction device, which can be applied to fuel battery, electrochemical reactor, and sensor etc. especially in the present scientific technique it always requires the energy to be worked at the highest efficiency. For the work of fuel battery, since the fuel battery possesses high power efficiency and almost no pollution and its power efficiency is also much higher than the general generator, therefore it is always applied to the high technique products such as cellular phone, global position system, personal digital assistant, B.B. Call, and notebook computer etc., those products not only require high efficiency, but also possess demands for light, thin, and small volume.

The raw materials of fuel battery are hydrogen gas (or containing hydrogen liquid molecules such as alcohols) and oxygen gas, wherein they proceed the chemical reaction at the high temperature by using the device of generating power, hence the structure of chemical reaction substrate of fuel battery affects the battery efficiency and the battery volume quite much.

FIG. 1 illustrates the known conventional battery structure, wherein the known conventional structure is that on the both sides of electrolyte layer 4 it sequentially forms the porous conductive layer 6 and catalytic layer 7, no substrate presents, catalytic layer 7 forms on the top and bottom of battery, on the catalytic layer 7 it forms two porous conductive layers 6 face to face, the electrolytes 4 fill between up-and-down face-to-face porous conductive layers 6, if it attempts to utilize the stacking multi-layer method to increase the efficiency of the conventional battery, it has to increase the volume of battery structure.

SUMMARY OF THE INVENTION

Hence, the aim of the present invention is to solve the drawbacks described above. In order to avoid the presence of the drawbacks described above, the present invention is to provide a kind of the structure of electrochemical reaction device, wherein on one side of the device includes a plurality of slots with an appropriate width-depth ratio to increase its surface area.

The other aim of the present invention is to provide a kind of the structure of electrochemical reaction device, wherein the substrate which is used to make the device includes a plurality of vertical penetrating holes with an appropriate size, the electrolytes are formed in the vertical penetrating holes and the substrate surface to increase the contacting areas of electrolytes and the strength of the structure.

The other aim of the present invention is to provide a kind of the structure of electrochemical reaction device, wherein by increasing the contacting areas of substrate and electrolytes it increases the efficiency, hence it minimizes the battery volume and also possesses high efficiency.

The other aim of the present invention is to provide a kind of the structure of electrochemical reaction device, wherein on an electrolyte layer or between a double-layer substrates it forms a selective isolating layer to reduce the problems of fuel being penetrated electrolytes and to increase the efficiency.

In order to obtain the aims descried above, the present invention is to provide a kind of the structure of electrochemical reaction device, wherein on one side of substrate by using heat-pressure, photolithography, etching, and shooting etc. method it forms having plural sets of slots with an appropriate width-depth ratio, then by using optical instrument, laser penetrating holes, and etching etc. method on the substrate it forms penetrating vertical holes with an appropriate size, electrolytes are formed on the holes and the substrate surface, on the electrolyte layer it sequentially forms a porous conductive material layer and a catalytic material layer to increase the surface areas of substrate and increase the contacting areas of electrolytes, on its electrolyte layer or between its double-layer substrate it forms a selective isolating layer to reduce the problems of fuel being penetrated electrolytes and to increase the efficiency, and it forms a small volume and having highly efficient electrochemical reaction substrate.

BRIEF DESCRIPTION OF THE DRAWINGS

Detailed description and technique contents of the present invention will be described by the accompanying drawings as follows.

DETAILED DESCRIPTION OF THE PREFERRED EMBODIMENTS

EXAMPLE 1, THE PRESENT INVENTION

Figure 1:
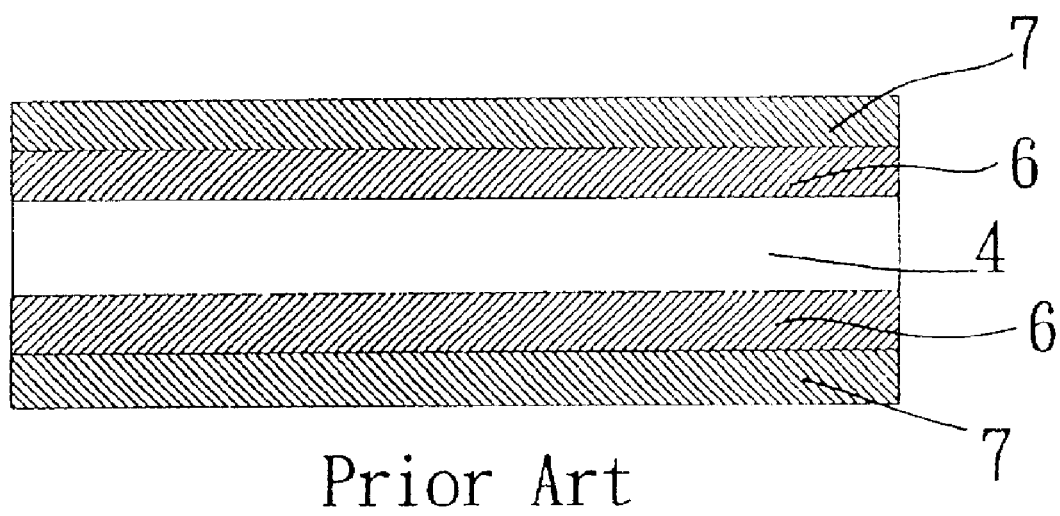
FIG. 1 illustrates the cross-sectional view of the known conventional fuel battery.
Figure 2A:
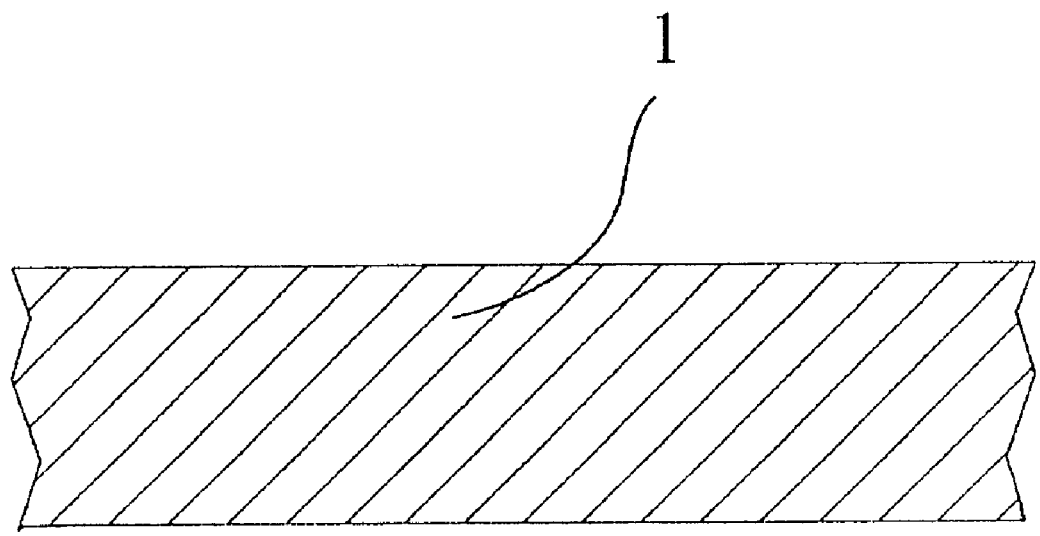
FIGS. 2a, 2b, 2c, 2d, 2e, and 2f illustrate the cross-sectional views of the first example manufacturing process for the present invention of highly efficient electrochemical reaction substrate.
Figure 2B:
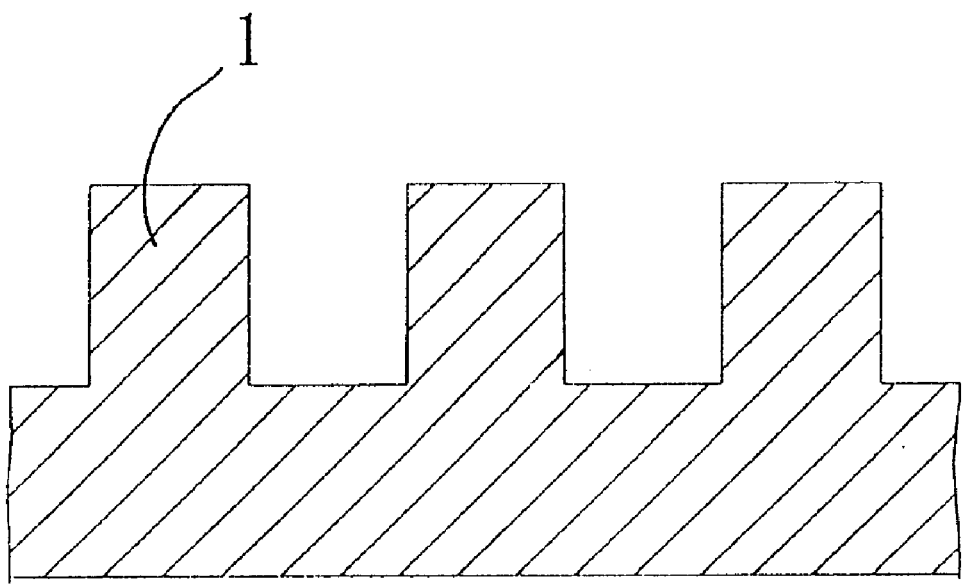
Figure 2C:
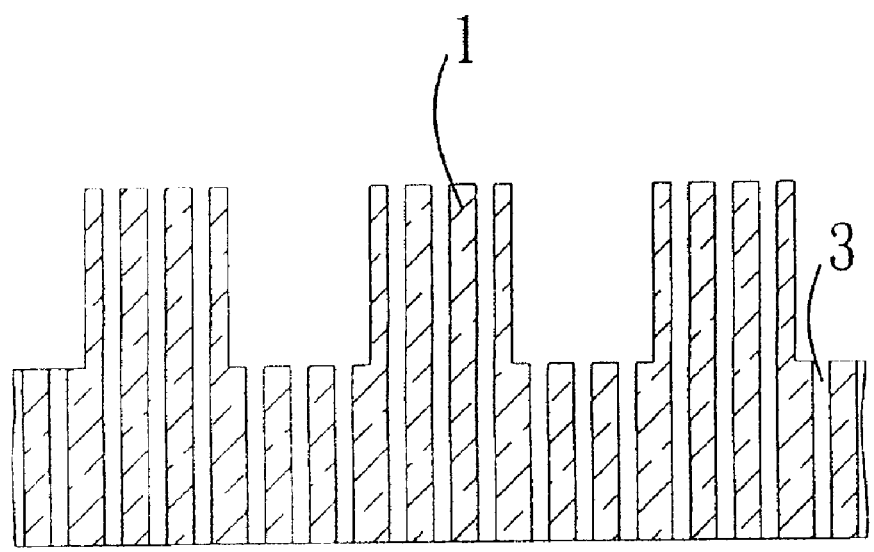

FIGS. 2a, 2b, 2c, 2d, 2e, and 2f illustrate the cross-sectional views of the first example manufacturing process for the present invention of highly efficient electrochemical reaction device. FIG. 2a illustrates a thickness 10~1000 $\mu$m substrate 1, wherein the substrate 1 can be selected from polymer, silicon wafer, or metal oxides etc. material. FIG. 2b illustrates on one side of substrate 1 by using heated pressure, photolithography, etching, etc. method it forms having plural sets of slots with an appropriate width-depth ratio on the substrate 1. FIG. 2c illustrates by using optical instrument, laser penetrating holes, and etching etc. method on the substrate 1 it forms vertical penetrating holes 3 with an aperture size 1~100 $\mu$m, the holes 3 extend vertically through the substrate 1.

Figure 2D:
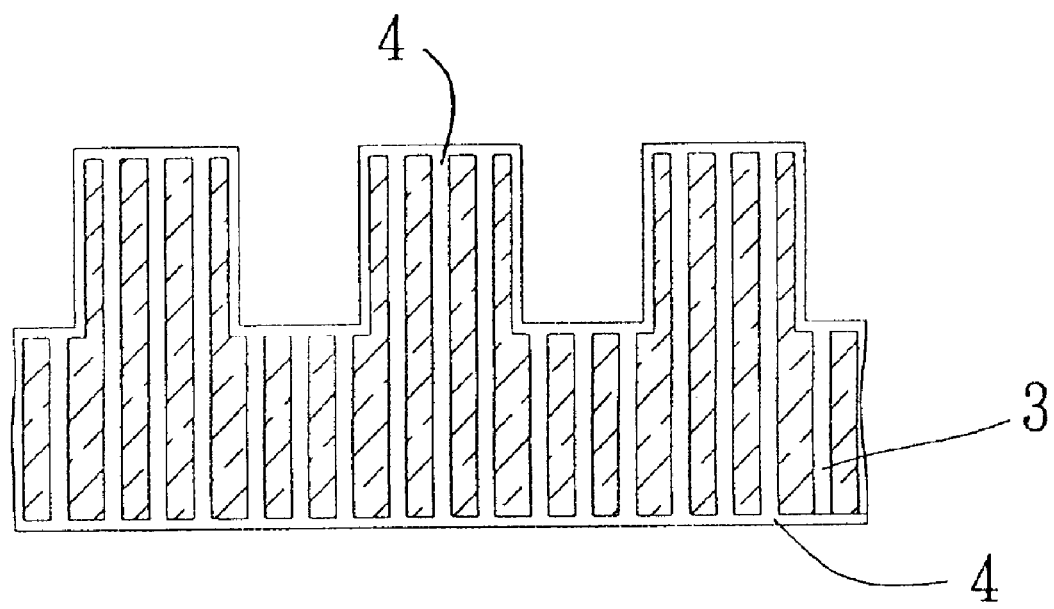
Figure 2E:
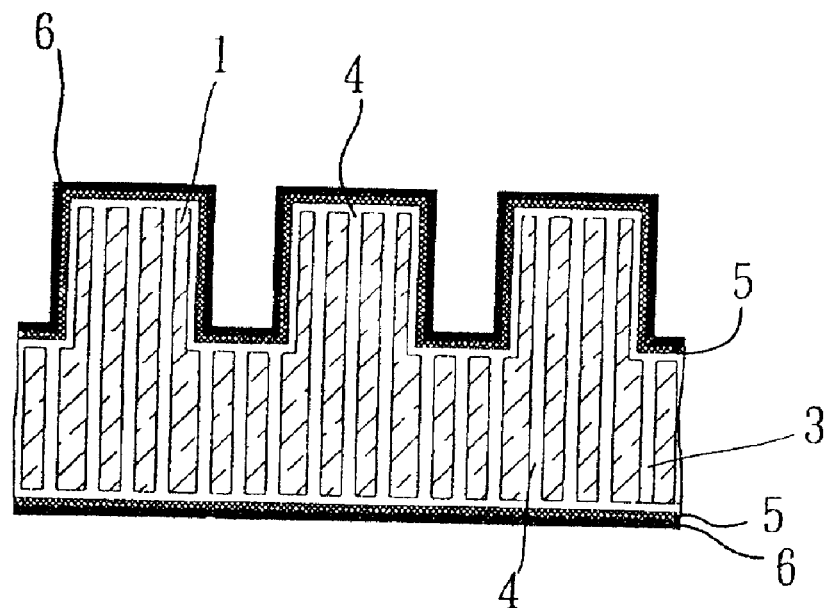
Figure 2F:
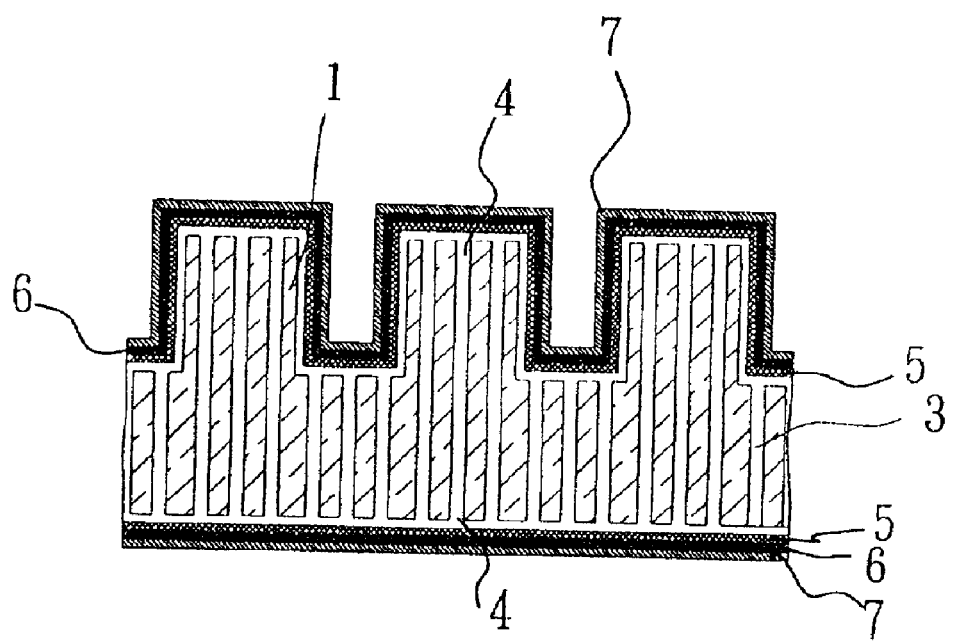

FIG. 2d illustrates by using dipping and coating method the electrolytes are formed in the holes 3 to produce an electrolyte layer 4 on the substrate 1 surface, the structure of the holes 3 increase the contacting areas of electrolytes 4 and substrate 1, and the strength of the structure. The electrolyte material can be selected from polymer and solid electrolyte. FIG. 2e illustrates on the electrolyte layer 4 by using screen print, chemical vapordeposition (CVD), sputtering, spray, dip coating, spin coating, and electroless plating etc. method it forms a selective isolating layer 5 on its electrolyte layer 4. The isolating layer 4 has a characteristic which prevents the passage of fuel therethrough to reduce the problem which would occur when fuel penetrates into the electrolyte. The selective isolating layer 5 can be molecular isolating layer or ionic isolating layer with the thickness of 10~500 nm. On the selective isolating layer 5 then by using CVD, screen print, sputtering, spray, dip coating, spin coating, and electroless plating method it forms a thickness 10~500 nm porous conductive material layer 6, wherein the conductive material layer 6 can selected from graphite, gold, platinum, palladium, containing boron diamond, refractory metal, and conductive refractory composite etc. material. FIG. 2f illustrates on the porous conductive material layer 6 by using sputtering, CVD, and electroless plating etc. method it forms a catalytic material layer 7, wherein the catalytic material layer 7 can be selected from noble metal, noble metal alloy, and noble metal composite etc. material, its thickness can be 5~1000 A. Through the process described above it forms a small volume and having highly efficient electrochemical reaction substrate.

EXAMPLE 2, THE PRESENT INVENTION

Figure 3A:
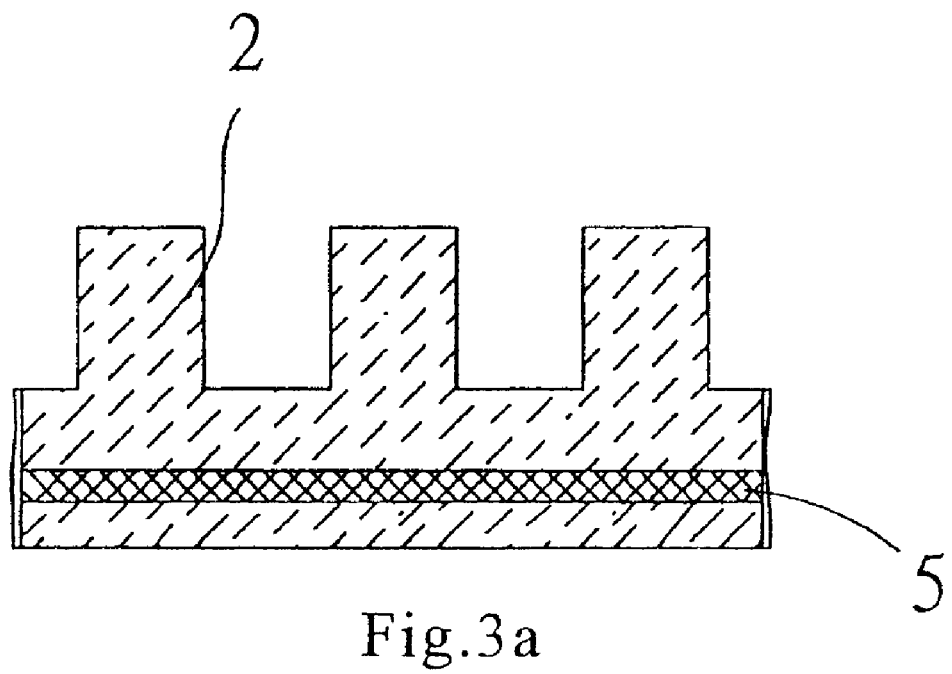
FIGS. 3a, 3b, 3c, 3d, and 3e illustrate the cross-sectional views of the second example manufacturing process for the present invention of highly efficient electrochemical reaction substrate.
Figure 3B:
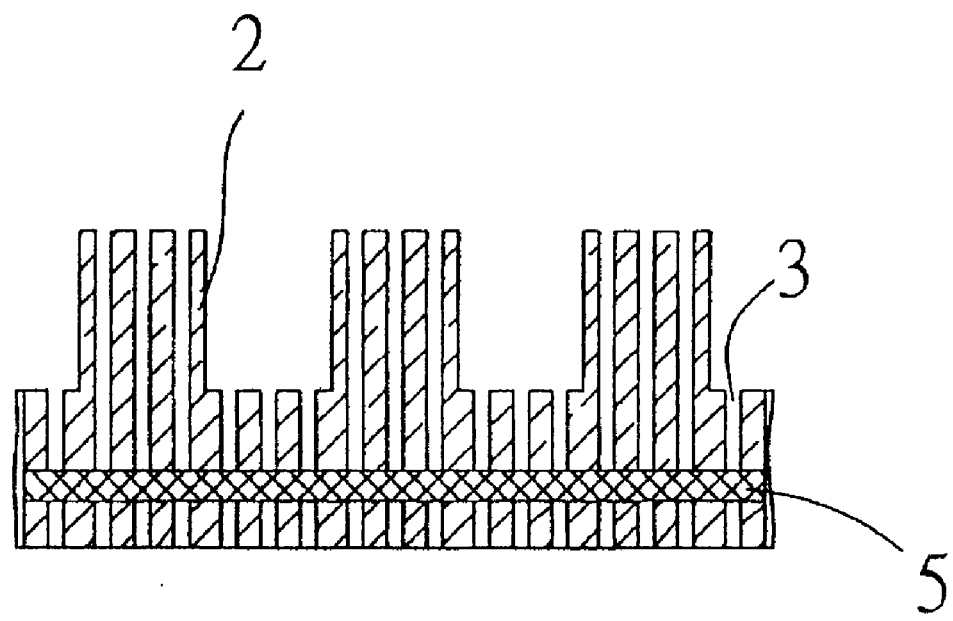

FIGS. 3a, 3b, 3c, 3d, and 3e illustrate the cross-sectional views of the second example manufacturing process for the present invention of highly efficient electrochemical reaction device. FIG. 3a illustrates between face-to-face double-layer substrates 2 with thickness 10~1000 µm by using screen print, CVD, sputtering, spray, dip coating, spin coating, and electroless plating etc. method it forms a selective isolating layer 5 on its electrolyte layer. The selective isolating layer prevents the fuel from passing therethrough and thereby reduces the problem which would occur when fuel penetrates into the electrolyte. Selective isolating layer 5 can be a molecular isolating layer or an ionic isolating layer with the thickness of 10–500 nm. On one side of the double-layer substrate 2 by using heated pressure, photolithography, etching, etc. method it forms having plural sets of slots with an appropriate width-depth ratio on the double-layer substrate 2, wherein the double-layer substrate 2 can be selected from polymer, silicon wafer, or metal oxides etc. material. FIG. 3b illustrates by using optical instrument, laser penetrating holes, and etching etc. method on the double-layer substrate 2 it forms vertical penetrating holes 3 with an aperture size 1–100 µm. The penetrated holes 3 are vertically penetrated the double-layer substrate 2.

Figure 3C:
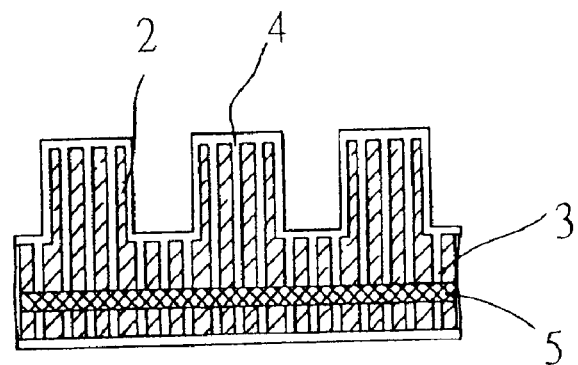
Figure 3D:
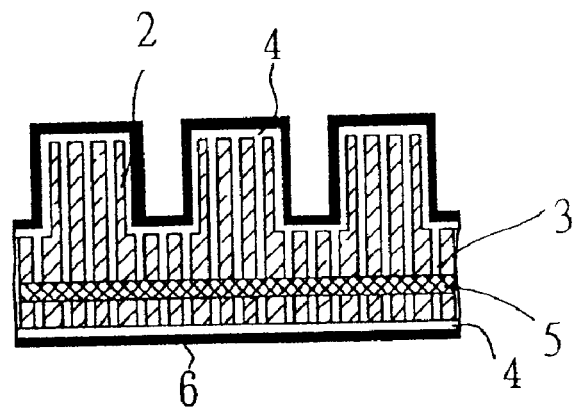
Figure 3E:
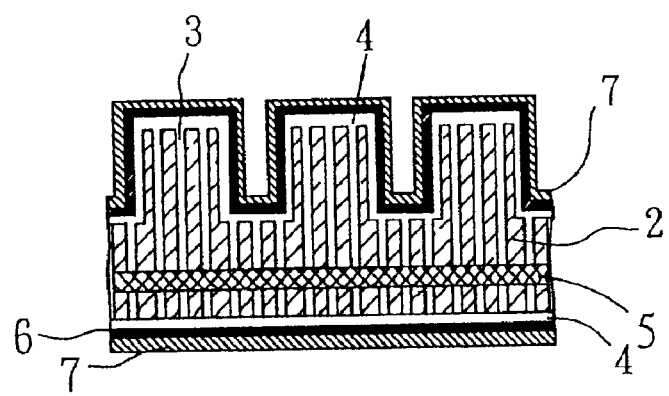

FIG. 3c illustrates by using dipping and coating method the electrolytes are formed in the holes 3 to produce an electrolyte layer 4 on the double-layer substrate 2 surface. The electrolyte material can be selected from polymer and solid electrolyte. FIG. 3d illustrates by using CVD, screen print, sputtering, spray, dip coating, spin coating, and electroless plating method it forms a thickness 10~500 nm porous conductive material layer 6 on the electrolyte layer 4. The porous conductive material layer 6 can be selected from graphite, gold, platinum, palladium, containing boron diamond, refractory metal, and conductive refractory composite etc. material. Finally, on the porous conductive material layer 6 by using sputtering, CVD, and electroless plating etc. method it forms a catalytic material layer 7 as illustrated in FIG. 3e. The catalytic material layer 7 can be selected from noble metal, noble metal alloy, and noble metal composite etc. material, its thickness can be 5~1000 A. Through the process described above it forms a small volume and having highly efficient electrochemical reaction device.

the present invention specially discloses and describes selected the best examples. It is to be understood, however, that the present invention is not limited to the specific features shown and described. The invention is claimed in any forms or modifications within the spirit and scope of the appended claims.

What is claimed is:

1. An electrochemical reaction device which comprises:
   a substrate having an upper surface and a lower surface and a plurality of slots on said upper surface;
   a plurality of vertical penetrating holes which penetrate through said substrate;
   electrolyte which fills said holes and is configured to form an electrolyte layer on said upper and lower surface;
   a selective isolating layer on said electrolyte layer, said isolating layer being adapted to prevent fuel from passing therethrough into said electrolyte layer;
   a porous electrically conductive layer on said isolating layer; and
   a layer of catalytic material on said electrically conductive layer.

2. The device of claim 1 wherein said substrate has a thickness of 10–1000 µm and said substrate is a material selected group the consisting of polymer, silicon wafer, and metal oxide.

3. The device of claim 1 wherein said slots are made by a process which utilizes heated pressure, photolithography or etching.

4. The device of claim 1 wherein said vertical penetrating holes are formed by a process using an optical instrument or a laser, or are formed by etching, and said vertical penetrating holes have an aperture size of 1–100 µm.

5. The device of claim 1 wherein the electrolyte of said electrolyte layer is selected from the group consisting of polymer and solid electrolyte.

6. The device of claim 1 wherein said selective isolating layer is a molecular or ionic isolating layer having a thickness of 10–500 nm.

7. The device of claim 1 wherein said selective isolating layer is formed using screen printing, CVD, sputtering, spraying, dip coating, spin coating or electroless plating.

8. The device of claim 1 wherein said porous conductive layer is made from a material selected from the group consisting of graphite, gold, platinum, palladium, boron diamond, refractory metal and conductive refractory composite material.

9. The device of claim 1 wherein said porous conductive layer has a thickness in the range of 10–500 nm and said conductive porous layer is formed by a process selected from the group consisting of screen printing, CVD, sputtering, spraying, dip coating, spin coating and electroless plating.

10. The device of claim 1 wherein the catalytic layer has a thickness of 5–1000 Å and said catalytic layer is made from a material selected from the group consisting of noble metal, noble metal alloy, and noble metal composite, and said catalytic layer is formed from a process selected from a group consisting of sputtering, CVD, and electroless plating.

11. An electrochemical reaction device which comprises:
    a substrate which comprises an upper substrate layer and a lower substrate layer wherein said upper substrate layer has a plurality of slots therein;
    a selective isolating layer between said upper substrate layer and said lower substrate layer;
    a plurality of vertical penetrating holes which penetrate through said upper and lower substrate layers, said penetrating holes being filled with electrolyte whereby said electrolyte defines an electrolyte layer on said substrate;

a porous conducting layer on said electrolyte layer; and a catalytic layer on said porous conductive layer;

said selective isolating layer being adapted to prevent fuel from passing therethrough into the electrolyte.

12. The electrochemical reaction device of claim 11 wherein said substrate has a thickness in the range of 10–1000 μm and said substrate is made of material selected from the group consisting of polymer, silicon wafer and metal oxide.

13. The device of claim 11 wherein said slots are made by a process which utilizes heated pressure, photolithography or etching.

14. The device of claim 11 wherein said vertical penetrating holes are formed by a process using an optical instrument or a laser, or are formed by etching, and said vertical penetrating holes have an aperture size of 1–100 μm.

15. The device of claim 11 wherein the electrolyte of said electrolyte layer is selected from the group consisting of polymer and solid electrolyte.

16. The device of claim 11 wherein said selective isolating layer is a molecular or ionic isolating layer having a thickness of 10–500 nm.

17. The device of claim 11 wherein said selective isolating layer is formed using screen printing, CVD, sputtering, spraying, dip coating, spin coating or electroless plating.

18. The device of claim 11 wherein said porous conductive layer is made from a material selected from the consisting of graphite, gold, platinum, palladium, boron diamond, refractory metal and conductive refractory composite material.

19. The device of claim 11 wherein said porous conductive layer has a thickness in the range of 10–500 nm and said conductive porous layer is formed by a process selected from the group consisting of screen printing, CVD, sputtering, spraying, dip coating, spin coating and electroless plating.

20. The device of claim 11 wherein the catalytic layer has a thickness of 5–1000 Å and said catalytic layer is made from a material selected from the group consisting of noble metal, noble metal alloy, and noble metal composite, and said catalytic layer is formed from a process selected from a group consisting of sputtering, CVD, and electroless plating.

* * * * *